United States Patent
Bergeron (10) Patent No.: US 10,230,824 B2
(45) Date of Patent: Mar. 12, 2019

(54) PACKET CLASSIFICATION USING MEMORY POINTER INFORMATION

(71) Applicant: Ixia, Calabasas, CA (US)

(72) Inventor: Matthew R. Bergeron, Thousand Oaks, CA (US)

(73) Assignee: KEYSIGHT TECHNOLOGIES SINGAPORE (HOLDINGS) PTE. LTE., Singapore (SG)

( * ) Notice: Subject to any disclaimer, the term of this patent is extended or adjusted under 35 U.S.C. 154(b) by 134 days.

(21) Appl. No.: 14/944,078

(22) Filed: Nov. 17, 2015

(65) Prior Publication Data
US 2016/0140045 A1    May 19, 2016

Related U.S. Application Data (60) Provisional application No. 62/080,973, filed on Nov. 17, 2014.

(51) Int. Cl.
*H04L 29/06* (2006.01)

(52) U.S. Cl.
CPC .............. *H04L 69/22* (2013.01); *H04L 69/12* (2013.01)

(58) Field of Classification Search
CPC ................................ H04L 69/22; H04L 69/12
See application file for complete search history.

(56) References Cited

U.S. PATENT DOCUMENTS

| | | | |
|---|---|---|---|
| 6,412,000 B1 * | 6/2002 | Riddle | H04L 29/06 370/230 |
| 7,032,072 B1 * | 4/2006 | Quinn | H04L 29/06 370/230.1 |
| 7,230,627 B2 | 6/2007 | Freker et al. | |
| 7,412,369 B1 | 8/2008 | Gupta | |
| 7,580,356 B1 * | 8/2009 | Mishra | H04L 43/026 370/230.1 |
| 8,656,135 B2 | 2/2014 | Gounares et al. | |
| 2003/0081615 A1 * | 5/2003 | Kohn | G06F 1/3203 370/395.42 |
| 2007/0008888 A1 * | 1/2007 | Chawla | C07C 51/60 370/230 |
| 2009/0106506 A1 | 4/2009 | Skerlj et al. | |

(Continued)

FOREIGN PATENT DOCUMENTS

WO    WO 2014/074168 A1    5/2014

OTHER PUBLICATIONS

"IxNetwork:Specifications," Ixia, Deliver on (Jul. 8, 2013).

(Continued)

*Primary Examiner* — Michael Alsip (57) ABSTRACT

Methods, systems, and computer readable media for packet classification are disclosed. According to one method, the method includes receiving a packet containing header information for packet classification. The method also includes determining, using the header information, a first memory address identifier. The method further includes determining, using the first memory address identifier, memory pointer information indicating a second memory address identifier. The method also includes obtaining, using the memory pointer information indicating the second memory address identifier, packet related information from a memory. The method further includes performing, using the packet related information, a packet classification action.

14 Claims, 6 Drawing Sheets

(56) References Cited

U.S. PATENT DOCUMENTS

| | | | | |
|---|---|---|---|---|
| 2012/0039332 A1* | 2/2012 | Jackowski | ............ | H04L 69/32 |
| | | | | 370/389 |
| 2013/0058230 A1* | 3/2013 | Wvong | ................ | H04L 43/12 |
| | | | | 370/252 |
| 2015/0341473 A1* | 11/2015 | Dumitrescu | ........... | H04L 69/22 |
| | | | | 370/392 |
| 2018/0293163 A1 | 10/2018 | Bergeron | | |

OTHER PUBLICATIONS

Commonly-assigned, co-pending U.S. Appl. No. 15/948,728 for "Optimizing Storage of Application Data in Memory," (Unpublished, filed Apr. 9, 2018).

3D XPoint, https://en.wikipedia.org/wiki/3D_XPoint, pp. 1-4 (Mar. 22, 2018).

Pessl et al., "Reverse Engineering Intel DRAM Addressing and Exploitation," http://arxiv.org/pdf/1511.08756v2, pp. 1-10 (Nov. 30, 2015).

"Lacking Rhoticity: How physical addresses map to rows and banks in DRAM," pp. 1-6 (May 4, 2015).

\* cited by examiner

| MEMORY LOCATION ADDRESS | SOURCE ADDRESS | SOURCE PORT | DESTINATION ADDRESS | DESTINATION PORT | PROTOCOL | MEMORY POINTER INFO | FLOW ID (FLID) | PACKET COUNTER VALUE |
|---|---|---|---|---|---|---|---|---|
| B1-363 | A | 23 | B | 34 | UDP | B5-5363 | 3453 | 45646 |
| B2-546 | C | 53 | D | 23 | TCP | B7-382 | 3458 | 13154 |
| B1-56 | F | 43 | E | 24 | TCP | | 12 | 457 |
| B3-24 | Z | 456 | H | 65 | RTP | B4-642 | 4563 | 596 |
| B5-3469 | G | 7 | R | 7 | UTP | B3-657 | 2342 | 123 |
| B6-7889 | K | 80 | P | 80 | TCP | | 27 | 6 |

PACKET CLASSIFICATION USING MEMORY POINTER INFORMATION

PRIORITY CLAIM

This application claims the benefit of U.S. Provisional Patent Application Ser. No. 62/080,973, filed Nov. 17, 2014; the disclosure of which is incorporated herein by reference in its entirety.

TECHNICAL FIELD

The subject matter described herein relates to processing information. More specifically, the subject matter relates to methods, systems, and computer readable media for packet classification.

BACKGROUND

Packet classification generally involves classifying one or more attributes associated with one or more related packets (e.g., flows). Conventional packet classifiers utilize expensive memory resources. For example, a conventional packet classifier may utilize content-addressable memory (CAM) or ternary CAM (TCAM) which is a special type of computer memory usable to search for associated data using a search value (or key value). In this example, using CAM, the packet classifier may search a table of stored data using packet header information associated with a given packet as the key value and identify a relevant memory address containing information about the packet or flow. After identifying a relevant memory address, the packet classifier may read memory content associated with the memory address and perform one or more classification actions.

While CAM is extremely fast compared to other types of memory, CAM is expensive, has greater physical dimensions, and generally has a higher power consumption rate than other types of memory. For example, comparison circuitry may be needed for each memory location in a CAM chip, thereby increasing the physical size of the CAM chip which increases manufacturing cost. Moreover, the additional comparison circuitry results in increased power consumption. Because of the shortcomings associated with CAM, conventional packet classifiers have limited amounts of CAM and, therefore, are restricted in the number of packets that can be monitored and/or classified.

Accordingly, in light of these difficulties, a need exists for improved methods, systems, and computer readable media for packet classification.

SUMMARY

Methods, systems, and computer readable media for packet classification are disclosed. According to one method, the method includes receiving a packet containing header information for packet classification. The method also includes determining, using the header information, a first memory address identifier. The method further includes determining, using the first memory address identifier, memory pointer information indicating a second memory address identifier. The method also includes obtaining, using the memory pointer information indicating the second memory address identifier, packet related information from a memory. The method further includes performing, using the packet related information, a packet classification action.

According to one system, the system includes a packet classifier comprising at least one processor and memory. The packet classifier is configured to receive a packet containing header information for packet classification, to determine, using the header information, a first memory address identifier, to determine, using the first memory address identifier, memory pointer information indicating a second memory address identifier, to obtain, using the memory pointer information indicating the second memory address identifier, packet related information from a memory, wherein the memory pointer information is associated with the first memory address identifier, and to perform, using the packet related information, a packet classification action.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the term "module" refers to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for packet classification. Conventional packet classifiers may classify packets and generate metrics associated with flows (e.g., related packets) by using a memory module or related data structure which includes an entry or record for each unique flow (e.g., a session or packet group identifier) encountered. Memory requirements for such systems are therefore directly proportional to the number of flows monitored or classified. As such, conventional packet classifiers require significant memory resources and significant hardware resources for handling scenarios with substantial flows. Since conventional packet classifiers include limited amounts of fast but expensive memory resources, such as content-addressable memory (CAM), conventional packet classifiers are generally limited in the number of flows that can be monitored and/or classified.

In accordance with some aspects of the subject matter described herein, a computing platform (e.g., a testing platform, a device, or a node) or a module (e.g., a field-programmable gateway array (FPGA), an application-specific integrated circuit (ASIC), or software executing on a processor) may be configured to classify and/or monitor packets or other data units in a cost effective and resource efficient manner. For example, a computing platform or module in accordance with aspects of the present disclosure may be configured to classify a large number of packets at or near line speed and may use a random-access memory (RAM), a dynamic RAM (DRAM), a synchronous DRAM (SDRAM), or other non-content-addressable memory (non-CAM) for storing packet related information (e.g., flow related metrics).

In accordance with some aspects of the subject matter described herein, a computing platform or module may be configured to use one or more memory access queues for accessing one or more memory banks, memory ranks (e.g., two or more contiguous memory banks), or other logical units of storage. For example, a DRAM module may include eight memory banks that operate independently from each other. In this example, a packet classifier or related memory controller may utilize eight memory access queues, where each queue is associated with a unique memory bank.

In accordance with some aspects of the subject matter described herein, a computing platform or module may be configured to store memory pointer information associated with a memory address identifier, where the memory pointer information indicates one or more memory locations that may be associated with a given packet or flow. For example, assuming that three flows are associated with a same hash value that indicates a first memory address, the first memory address may include data for a first flow and a reference to a second memory address. The second memory address may include data for a second flow and a reference to a third memory address, where the third memory address may include data for a third flow. In this example, when attempting to access data for one of the three flows, each memory address may be accessed in sequence until the appropriate data is accessed, thereby providing a "linked list" or chain-like data structure for storing and/or accessing data related to different flows associated with the same hash value.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
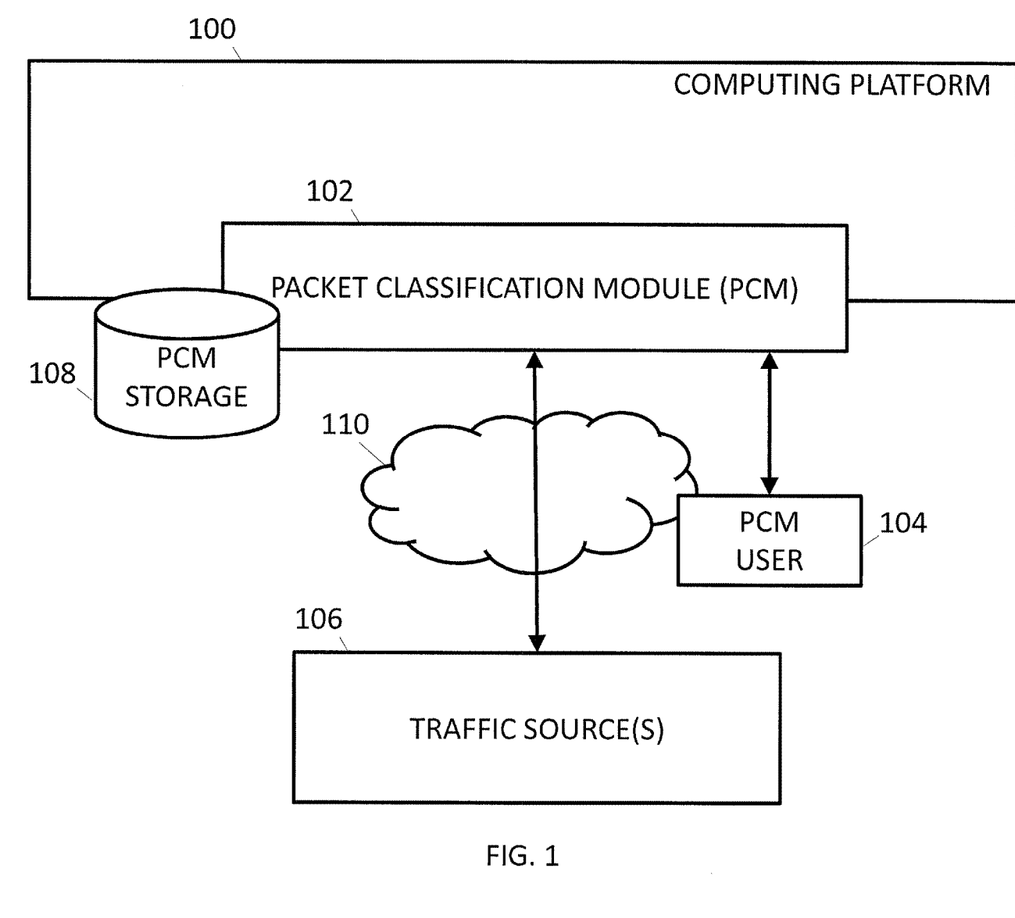
FIG. 1 is a diagram illustrating an exemplary computing platform for packet classification according to an embodiment of the subject matter described herein.

FIG. 1 is a diagram illustrating an exemplary computing platform 100 for packet classification according to an embodiment of the subject matter described herein. Computing platform 100 may represent any suitable entity or entities (e.g., one or more testing platforms, nodes, or devices) associated with sending or receiving traffic (e.g., one or more data units). For example, computing platform 100 may receive a substantial amount of traffic from one or more traffic source(s) 106, such as a network router, a network switch, a server, or another node. In this example, computing platform 100 may receive traffic from traffic source(s) 106 and analyze one or more performance aspects associated with traffic source(s) 106.

In some embodiments, computing platform 100 may be a stand-alone tool, a testing device, an analyzing device, or software executing on a processor. In some embodiments, computing platform 100 may be a single node or may be distributed across multiple computing platforms or nodes.

In some embodiments, computing platform 100 may include one or more modules for performing various functions. For example, computing platform 100 may include a packet generation module for generating traffic for communicating with traffic source(s) 106 and/or a network node emulation module for emulating a node or device that communicates with traffic source(s) 106.

Computing platform 100 may include a packet classification module (PCM) 102. PCM 102 may be any suitable entity or entities (e.g., software executing on a processor, an ASIC, an FPGA, or a combination of software, an ASIC, or an FPGA) for performing one or more aspects associated with classifying (e.g., receiving, generating, sorting, analyzing, and/or sending) packets or other messages. For example, PCM 102 may be configured to receive packets associated with a number of flows or sessions. In this example, each packet may include an FLID (e.g., a flow identifier) and/or other data (e.g., header information and payload information) usable to classify or identify one or more attributes about the packet or a related flow. Continuing with this example, PCM 102 may access and utilize stored information associated with a given flow or packet when performing one or more packet classification actions.

In some embodiments, PCM 102 may include functionality for accessing a PCM storage 108. PCM storage 108 may be any suitable entity or entities (e.g., a storage device, a non-transitory computer readable medium, or a storage system) for maintaining or storing information related to packets, flows, and/or packet classification. For example, PCM storage 108 may contain information usable for generating and/or maintaining metrics (e.g., statistics) associated with one or more flows sent from or to traffic source(s) 106. Exemplary packet classification related information may include FLIDs, packet header information, memory pointers, packet counter values, metrics, statistics, and/or other information. In some embodiments, PCM storage 108 may be located at computing platform 100, PCM 102, another node, or distributed across multiple platforms or devices.

In some embodiments, PCM storage 108 may include a RAM, a DRAM, an SDRAM, and/or other non-CAM (e.g., memory having limited availability for memory access requests). For example, PCM storage 108 may include one or more two gigabyte (GB) SDRAM dual inline memory modules (DIMMs). In this example, each 2 GB SDRAM DIMM may include sixteen 128 megabytes (MB) DRAM integrated chips (ICs), where one or more ICs are stored in memory ranks. Each 128 MB DRAM IC may include eight memory banks and each memory bank may include 16 MB addressable memory space. Each memory bank may represent data stored in rows and columns. For example, a memory bank may include 16,384 rows having 1,024 column addresses per row, where each column address may represent eight bits (1 byte) of memory content.

In some embodiments, when accessing PCM storage 108, a minimum number of bits, also referred to as prefetch or prefetch data, may be accessed for every read and may be stored in a prefetch buffer. For example, a prefetch buffer of 64 bytes may be accessed and provided to a requesting entity (e.g., PCM 102) for every memory read request. In this example, PCM 102 or another entity may be configured to utilize at least some of the prefetch data when performing one or more aspects associated with packet classification.

In some embodiments, various memory related commands (e.g., an activate command, a precharge command, a memory write command, a memory read command, and/or memory access requests or responses) may be used to interact with rows and columns of memory content stored in PCM storage 108. For example, when accessing memory content stored in a matrix of rows and columns, a row may be activated prior to accessing data in the row. In contrast, when accessing data associated with a non-activated row, a currently activated row may be closed or de-activated before a new row may be activated. As such, a precharge command may be used to close a current row and an activate command may be used to open a new row. Generally, closing a row and activating a new row may take significantly more time than reading data from a row that is already activated.

In some embodiments, one or more memory related commands may be triggered by or associated with a memory access request, such as a memory write request or a memory read request. For example, a memory read request may trigger an activate command to activate a row and, subsequently, a memory read command for accessing data associated with the row.

In some embodiments, PCM storage 108 may be associated with memory timings that affect availability for memory access or related interactions. For example, various delays may be associated with activating a row, de-activating a row, reading data, writing data, and/or other access related actions. Memory timings may be related to memory performance and may affect how often PCM storage 108 or a portion therein (e.g., a memory bank) is available for processing. In some embodiments, memory timings may vary among memory portions associated with PCM storage 108.

In some embodiments, memory timings may represent common delays associated with one or more actions involving memory state and/or related interactions. For example, memory timings may include a column access strobe (CAS) latency (CL), a row address to column access delay (RCD), a row precharge delay (RPD), and a row active time (RAT).

In some embodiments, CL may represent an amount of time between sending a column address to a memory and receiving at least some memory content associated with the column address. For example, CL may represent the time that elapses before a first bit of memory is read from a DRAM when an appropriate row already activated.

In some embodiments, RCD may represent an amount of time between opening a row of memory and accessing columns within it. For example, a combined delay (RCD+CL) may represent the time that elapses after a row access and a column access is request but before a first bit of memory is read from a DRAM when no row is activated. In this example, RCD may take around 50 nanoseconds (ns) and CL may take around 10 ns for a combined delay of 60 ns.

In some embodiments, RPD may represent an amount of time between issuing a precharge command and opening a new row. For example, a combined delay (RPD+RCD+CL) may represent the time that elapses after a row access and a column access is request but before a first bit of memory is read from a DRAM when a different row is already activated.

In some embodiments, RAT may represent an amount of time between an activate command and issuing a precharge command. For example, RAT may represent the time that elapses when internally refreshing a row and may overlap with RCD. In some embodiments, RAT may be substantially equivalent to RCD+(2*CL) for DRAM or RCD+CL for SDRAM.

In some embodiments, PCM storage 108 may include a memory (e.g., an SDRAM) that is synchronized with a system bus, a central processing unit, and/or related clock. In such embodiments, memory timings (e.g., various delays associated memory access) may be rounded up to a next multiple of a clock period. For example, memory timings may be measured in clock cycles since synchronous memory may wait for a clock signal before responding to a control input, such as a memory related command. In this example, an RCD may indicate a number of clock cycles between opening a row of memory and accessing columns within it.

In some embodiments, PCM storage 108 may be associated with multiple logical units of storage that are independently operated from other logical units of storage. For example, assuming PCM storage 108 includes two independently operating memory banks, if a first memory bank is experiencing wait cycles (e.g., processing cycles with inactivity) due to performing a memory related command, other memory related commands may be sent to and/or performed by the second memory bank, e.g., during or concurrently with the wait cycles. In this example, since each memory bank may operate independently, delays associated with one memory bank do not affect the ability of another memory bank to perform various memory related commands (e.g., memory read and memory write requests).

In some embodiments, PCM 102 may include functionality for controlling memory access, e.g., to PCM storage 108. For example, PCM 102 may be configured to perform one or more functions associated with a memory access controller. PCM 102 may be configured to utilize one or more memory access queues for queuing memory related commands (e.g., memory read and memory write requests). In embodiments utilizing multiple memory access queues, PCM 102 may determine particular memory access queues for queuing memory related commands and may select appropriate memory related commands to process from the memory access queues.

In some embodiments, PCM 102 may include functionality for monitoring memory timings associated with various memory related commands that affect PCM storage 108 and/or other related interactions. For example, PCM 102 may be configured to maintain relevant information, such as one or more timers, related to access PCM storage 108 or memory portions therein. In this example, PCM 102 may select, for processing, a command from a memory access queue when a timer is up and/or when PCM storage 108 or memory portions therein are available for processing.

In some embodiments, PCM 102 may include functionality for utilizing multiple memory access queues for one or more portions of PCM storage 108. For example, PCM 102 may be configured to store memory related commands in a first memory access queue associated with a first memory bank and to store memory related commands in a second memory access queue associated with a second memory bank. Depending on memory bank availability, memory related commands from various memory access queues may be selected for processing by PCM 102. Continuing with the above example, PCM 102 may process memory related commands from the first memory access queue until the first memory bank is unavailable, e.g., in response to a delay associated with a precharge command. If the first memory bank is unavailable, PCM 102 may process memory related commands from the second memory access queue until the second memory bank is unavailable. In this example, PCM 102 may maintain timers and/or other information such that memory related commands are processed when one or more memory banks are available.

In some embodiments, PCM 102 may include functionality for receiving packets and/or for performing one or more packet classification actions. Exemplary packet classification actions may include identifying a related flow, incrementing a packet counter value, generating a packet related metric, logging packet related information, generating a notification message, and/or generating an error message. For example, PCM 102 may receive a packet and may use packet header information for classifying the packet as associated with a particular flow. After classifying a packet as associated with a particular flow, PCM 102 may store, obtain, generate, and/or update metrics, statistics, or other information about the flow and may store the information in PCM storage 108.

In some embodiments, PCM 102 may include functionality for utilizing one or more hash functions (e.g., a function or algorithm for mapping data of arbitrary size to data of fixed size) for storing or access packet related data. For example, a hash function may generate hash values within a particular range (0-9999). In some embodiments, the hash function may use packet header information (e.g., a source address, a source port, a destination address, a destination port, and/or a protocol identifier) and/or other information as input for generating hash values. After generating a hash value, the hash value or related information (e.g., three left-most bits of the hash value) may be used for accessing data (e.g., at PCM storage 108) associated with the packet or related flow.

In some embodiments, PCM 102 may include functionality for utilizing hash functions and/or related hash values to identify and/or determine a related memory address identifier associated with a given packet or flow. For example, using a memory address identifier associated with a particular flow, PCM 102 may store and/or access relevant data stored at PCM storage 108. However, it will be appreciated that some hash functions may result in collisions (e.g., when different input yields the same hash value) especially if the amount of unique input is substantially greater than the unique hash values generated.

In some embodiments, PCM 102 may include functionality for handling (e.g., mitigating, avoiding, alleviating, and/or overcoming) hash collisions, shared memory address identifiers, or other related issues. For example, a packet associated with a flow identifier 'A' may include packet header information that when used as input by a hash function generates a hash value of '34'. In this example, another packet associated with a flow identifier 'Z' may include packet header information that when used as input by the hash function also generates a hash value of '34'. If packets associated with different flows are associated with a same hash value, a same memory address may also be associated with the flows. To avoid storing information for different flows at the same memory address, PCM 102 may use various techniques and/or methods for storing information associated with different flows at different (e.g., unique) memory addresses, e.g., regardless of identical hash values. For example, in response to detecting a hash collision, a second hash function and/or different input may be used to generate a different hash value for at least one flow. In another example, a linked list data structure or other appropriate data structure may be utilized for storing different flows.

In some embodiments, PCM 102 may include functionality for accessing or storing data associated with a linked list or related data structure. For example, memory content located at each memory address may include packet related information (e.g., packet header information, a flow identifier, a packet counter value, etc.) and memory pointer information indicating another memory address identifier. In this example, after accessing memory content at a first memory address based on a hash value associated with a received packet, PCM 102 may determine that the memory content at the first memory address is not associated with the received packet. Continuing with the example, PCM 102 may use memory pointer information at the first memory address to identify a second memory address that may be associated with the received packet. Similarly, if the memory content located at the second memory address is not associated with the received packet, memory pointer information at the second memory address may indicate another memory address that may be associated with the received packet. In some embodiments, PCM 102 can "walk" or traverse a linked list of memory addresses until a memory address associated with a particular packet or flow is identified. In some embodiments, if no memory address is associated with a received packet, PCM 102 may allocate additional memory for storing information about the packet or flow.

In some embodiments, a prefetch buffer size may be related to a data amount stored for a particular packet or flow in PCM storage 108. For example, where a memory uses a prefetch buffer of 64 bytes, each data entry in a linked list data structure may include 64 bytes of data. In this example, a portion of the data (e.g., 48 bytes) may include flow identifying information, such as packet header information, and a smaller portion may include memory pointer information and/or metrics associated with a packet or flow. By storing data about the same as a prefetch buffer size, all relevant information, including memory pointer information, may be accessed with a single memory read request.

In some embodiments, PCM 102 may include one or more communications interfaces (e.g., one or more NICs) for interacting with users and/or nodes. For example, PCM 102 may use one or more communications interfaces for receiving and sending various types of data units; such as IP packets, Ethernet frames, Ethernet packets, PDUs, datagrams, UDP packets, TCP packets, IP version 4 (v4) packets, IP version 6 (v6) packets, stream control transmission protocol (SCTP) packets, real-time transport protocol (RTP) packets, or reliable data protocol (RDP) packets, packets using a tunneling protocol, and/or other data units.

In some embodiments, PCM 102 may provide a communications interface for communicating with PCM user 104. PCM user 104 may be any suitable entity (e.g., an automated system or a device or system controlled or controllable by a human user) for configuring various aspects associated with PCM 102. For example, various user interfaces (e.g., an application user interface (API) and a graphical user interface (GUI)) may be provided for implementing classification techniques and for providing configuration information. Exemplary user interfaces for configuring PCM 102 may support automation (e.g., via one or more scripting languages), a representation state transfer (REST) API, a command line, and/or a web based GUI.

In some embodiments, PCM 102 may include one or more communications interfaces for interacting with traffic source(s) 106. Traffic source(s) 106 may be any suitable entity or entities (e.g., devices, systems, or platforms) for communicating with computing platform 100, PCM 102, and/or for receiving, processing, or sending one or more data units. For example, traffic source(s) 106 may include a router, a network switch, a server, or a network controller. In another example, traffic source(s) 106 may include one or more systems and/or computing platforms, e.g., a data center or a group of servers and/or routers. In yet another example, traffic source(s) 106 may include one or more networks or related components, e.g., network 110, an access network, a core network, or the Internet.

Network 110 may be any suitable entity or entities for facilitating communications between various nodes and/or modules, e.g., in a test or a live environment. For example, network 110 may include an access network, a mobile network, the Internet, or another network for communicating with traffic source(s) 106, PCM user 104, PCM 102, and/or computing platform 100. In some embodiments, traffic source(s) 106, PCM user 104, PCM 102, and/or computing platform 100 may be located in or associated with network 110 or another location.

It will be appreciated that FIG. 1 is for illustrative purposes and that various nodes and/or modules, locations, and/or functionality described above in relation to FIG. 1 may be changed, altered, added, or removed.

Figure 2:
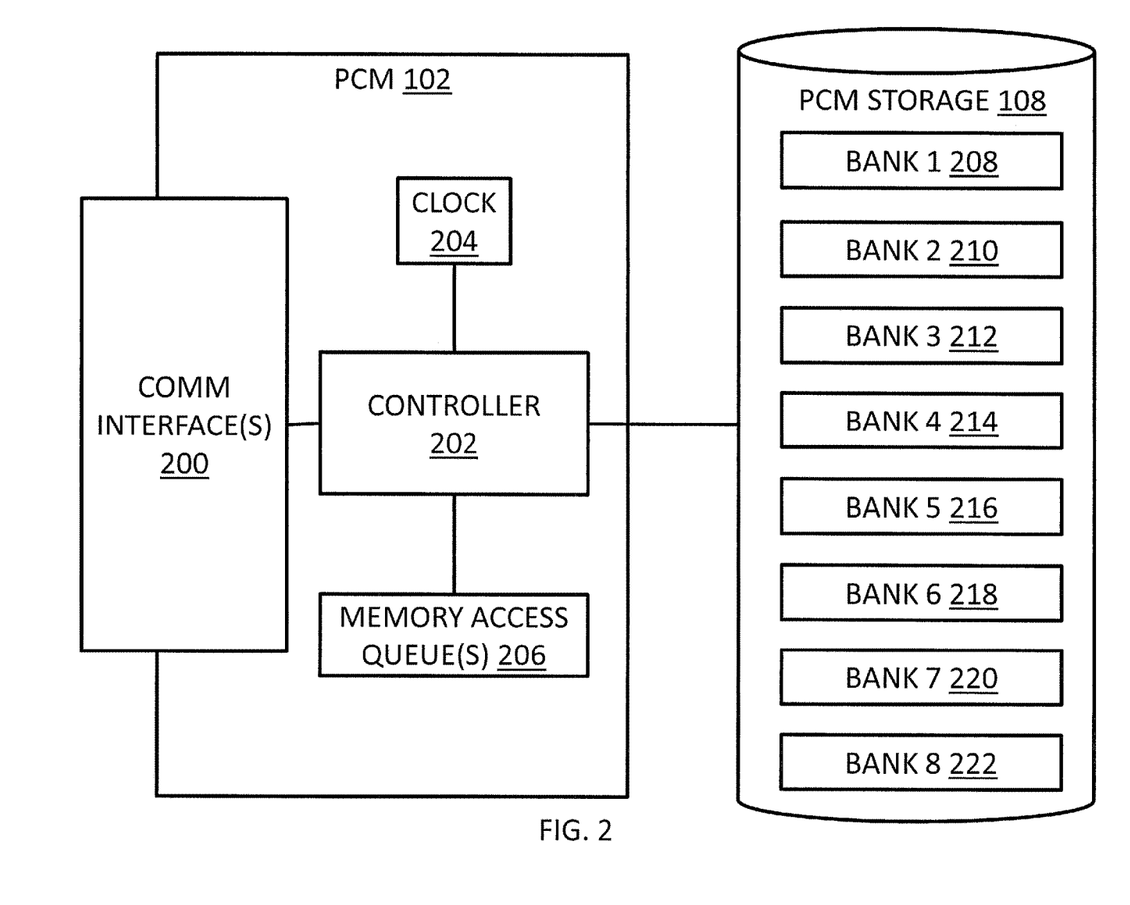
FIG. 2 is a diagram illustrating an exemplary packet classification module (PCM) according to an embodiment of the subject matter described herein.

FIG. 2 is a diagram illustrating PCM 102 according to an embodiment of the subject matter described herein. Referring to FIG. 2, PCM 102 may communicate with and/or access PCM storage 108. In some embodiments, PCM storage 108 may include memory banks 208-222. Each of memory banks 208-222 may be associated with a logical portion of storage and may be accessed and/or utilized independently from other storage portions. For example, memory bank 208 may be unavailable for processing due to a delay associated with an activate command, but memory bank 210 may be available for processing a memory write command.

PCM 102 may include one or more communications interface(s) 200, a controller 202, a clock 204, and one or more memory access queue(s) 206. Communications interface(s) 200 may represent any suitable entity or entities (e.g., a network interface card (NIC), an API, or other interface) for performing one or more communication related functions, e.g., receiving and/or sending packets and/or other data. For example, communications interface(s) 200 may receive packets from traffic source(s) 106. In another example, communications interface(s) 200 may receive packets or messages from PCM user 104 and/or elements or modules associated with computing platform 100.

Controller 202 may represent any suitable entity or entities (e.g., a FPGA, an ASIC, and/or software executing on a processor) for performing one or more aspects associated with packet classification. For example, controller 202 may be configured to receive packets from communications interface(s) 200, generate memory access requests associated with the packets, assign and/or insert requests into one or more memory access queue(s), and utilize clock 204 and/or other information for determining when requests may be processed by PCM storage 108 or memory banks 208-222 therein.

Clock 204 may represent any suitable entity (e.g., software executing on a processor, an FPGA, or an ASIC) for performing one or more functions associated with monitoring and/or generating clock cycles associated with PCM 102 or PCM storage 108. For example, clock 204 may provide a signal to one or more components in PCM 102 indicating that a command may be processed by PCM storage 108. In another example, clock 204 and/or another entity may maintain a timer associated with memory timings for each of memory banks 208-222 and/or related memory access queue(s) 206.

Memory access queue(s) 206 may represent any suitable entity or entities (e.g., memory, a data type implementation, and/or buffers) for storing and/or queuing memory related commands (e.g., memory read or memory write commands). For example, controller 202 may use a set of memory access queues 206 for a first memory rank (e.g., memory banks 208-214) and may use a different set of memory access queues 206 for a second memory rank (e.g., memory banks 216-212). In another example, controller 202 may use specialized memory access queues 206 for queuing different types of memory related commands. For example, controller 202 may use a read request queue for queuing memory read requests for reading memory content from PCM storage 108, a write request queue for queuing memory write requests for writing memory content to PCM storage 108, and/or a delete request queue for queuing memory delete requests for deleting memory content from PCM storage 108. In another example, controller 202 may use multiple queues for initial memory lookups into PCM storage 108 and a special queue for subsequent lookups into PCM storage 108, e.g., when traversing memory addresses associated with a linked list data structure.

In some embodiments, controller 202 may include functionality for processing packets at or near line speed. For example, an FPGA associated with controller 202 may be configured to parse packets at or near line speed (e.g., 40 gigabits per second (Gb/s) or greater). In this example, for each received packet, the FPGA may use some packet header information and a hash function to generate a hash value associated with the packet. Using hash values and/or other information, controller 202 may be configured to generate, queue and/or send one or more memory related commands for accessing PCM storage 108. Controller 202 may also be configured to obtain data from PCM storage 108 and use the information to perform one or more packet classification actions.

In some embodiments, controller 202 may include functionality for determining a particular memory address identifier associated with a packet or a related flow. For example, controller 202 may be configured to use one or more hash functions in determining a particular memory address identifier associated with a flow that a particular packet belongs. In this example, assuming a hash value is associated with multiple flows, controller 202 may use the generated hash value or some bits therein in determining an initial memory address identifier. The initial memory address identifier may identify a memory address that represents a starting entry in a linked list data structure, where each memory address or entry in the data structure may represent a different flow.

In some embodiments, controller 202 may include functionality for determining a particular memory access queue associated with a packet or a related flow. For example, controller 202 may be configured to use one or more hash functions in determining a particular memory access queue identifier associated with a flow that a particular packet belongs. In this example, controller 202 may use the generated hash value or some bits therein in determining one of memory access queues 206 to use for queuing memory related commands. In another example, controller 202 may use memory bank availability in determining one of memory access queues 206 to use for queuing memory related commands.

In some embodiments, controller 202 may include functionality for monitoring memory bank availability and/or memory timings associated with memory access or related actions. For example, controller 202 may select one or more memory access requests from a first queue of memory access queues 206. In this example, controller 202 may select the memory access requests in response to receiving information from clock 204 indicating that a related memory bank (e.g., memory bank 222) is capable of processing memory related commands.

In some embodiments, controller 202 may generate one or more memory related commands in response to selecting or retrieving a memory access request or other memory access command from memory access queue(s) 206. For example, in response to selecting a memory write request, controller 202 may generate and send to PCM storage 108 an activate command for activating a row and a memory write command for writing data associated with the row.

In some embodiments, controller 202 may include functionality for handling responses from PCM storage 108 and/or memory banks 208-222. For example, after processing a memory access request associated with a particular packet or flow, memory bank 208 may provide some data to controller 202. In this example, controller 202 may analyze the obtained data and determine whether the obtained data is related to the particular packet or flow. If the obtained data is related, controller 202 may perform a packet classification action using the data. If the data is not related, controller 202 may analyze the obtained data for a memory pointer indicating another memory address. Continuing with the above example, controller 202 may generate a new memory access request for requesting data associated with the memory address indicated by the memory pointer and may insert the new memory access request into one or more memory access queue(s) 206.

It will be appreciated that FIG. 2 is for illustrative purposes and that various nodes and/or modules, locations, and/or functionality described above in relation to FIG. 2 may be changed, altered, added, or removed. For example, one or more components (e.g., controller 202 and clock 204) associated with PCM 102 may be integrated into a single module. In another example, one or more components associated with PCM 102 may be located in a different node or at a device distinct from PCM 102, e.g., PCM storage 108 or a related IC.

Figure 3:
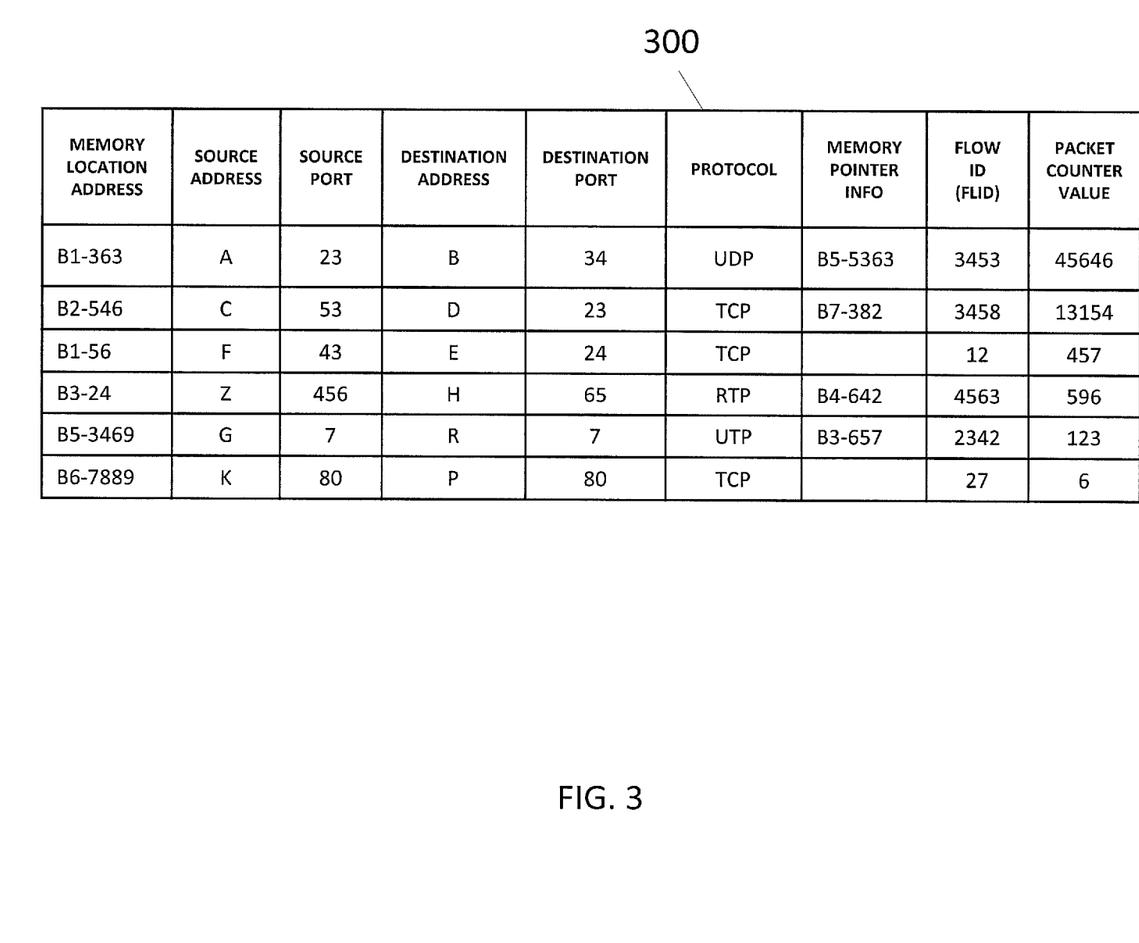
FIG. 3 is a diagram illustrating exemplary data for performing packet classification according to an embodiment of the subject matter described herein.

FIG. 3 is a diagram illustrating exemplary data 300 for performing packet classification according to an embodiment of the subject matter described herein. In some embodiments, data 300 may be accessed by computing platform 100 and/or PCM 102 and may be stored using various data structures. In some embodiments, data 300 may include any suitable information (e.g., packet routing information, packet switching information, metrics, or other data) associated with packet classification.

Referring to FIG. 3, data 300 may be depicted using a table representing associations between memory location addresses and memory content. In some embodiments, data 300 may be stored or maintained in PCM storage 108 and may be usable for performing packet classification action, generating packet related metrics, and/or for other purposes.

In some embodiments, each memory location address may represent a memory address identifier or other information (e.g., a hash value or portion therein) for identifying a portion of memory. In some embodiments, each memory address location may represent a portion of memory containing a finite amount of space or storage. For example, each memory address location may represent the start of 64 bytes of memory content.

In some embodiments, where PCM storage 108 includes a DRAM or memory that stores data 300 in a matrix of rows and columns, each memory address location may represent a row of memory content. Exemplary memory content may include packet related information (e.g., flow identifying information and metrics or statistics associated with a flow), and/or memory pointer information.

In some embodiments, flow identifying information may include any suitable information, such as a flow identifier (FLID) and/or packet header information, usable for identifying one or more related packets. For example, flow identifying information may include a source address, a destination address, a source port number, a destination port number, and/or an application protocol identifier. In this example, the flow identifying information may include 48 bytes of memory content. In another example, flow identifying information may include a FLID, such as a session identifier, represented as a single value or 1 byte of memory content.

In some embodiments, flow identifying information may be usable to determine whether a data entry (e.g., memory content associated with a particular memory address location) is associated with a packet or flow. For example, PCM 102 or a related entity may compare flow identifying information stored in memory and packet header information associated with a packet received by PCM 102. In this example, if the flow identifying information stored in memory and the packet header information match, it may be determined that the memory content is associated with the same flow as the received packet.

In some embodiments, metrics may include any suitable information usable for measuring one or more aspects associated with packets, flows, and/or packet classification. Exemplary metrics may include a packet loss metric, a packet delay metric, a jitter metric, a packet count metric, a packet ordering metric, a flow related metric, a source related metric, or a destination related metric.

In some embodiments, memory pointer information may include any suitable information, such as a memory address location or a memory address identifier, for indicating a portion of memory that may contain relevant packet related information. For example, PCM 102 or controller 202 may determine that memory content at a first memory address is not associated with a received packet. In this example, PCM 102 may use memory pointer information at the first memory address to identify a second memory address that may be associated with the received packet.

It will be appreciated that data 300 in FIG. 3 is for illustrative purposes and that different and/or additional information may be maintained for packet classification and/or other purposes. For example, data 300 may also include timestamps (e.g., time of transmission or reception) associated with packets, such timestamps may be used in generating delay metrics and/or may be used to set timers for assuming packet loss. Further, it will be appreciated that data 300 may be stored in various data structures, memories, media, and/or in one or more locations.

Figure 4A:
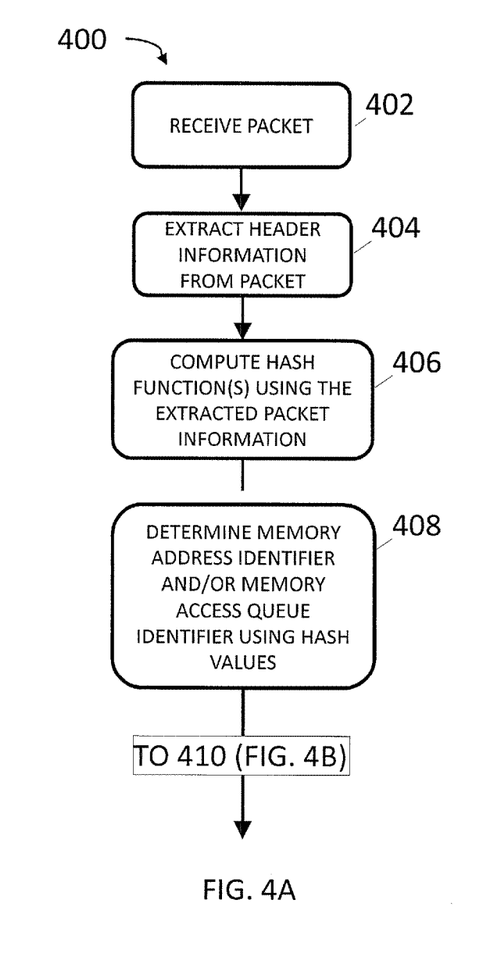
FIGS. 4A and 4B are diagrams illustrating an exemplary memory access process associated with packet classification according to an embodiment of the subject matter described herein.
Figure 4B:
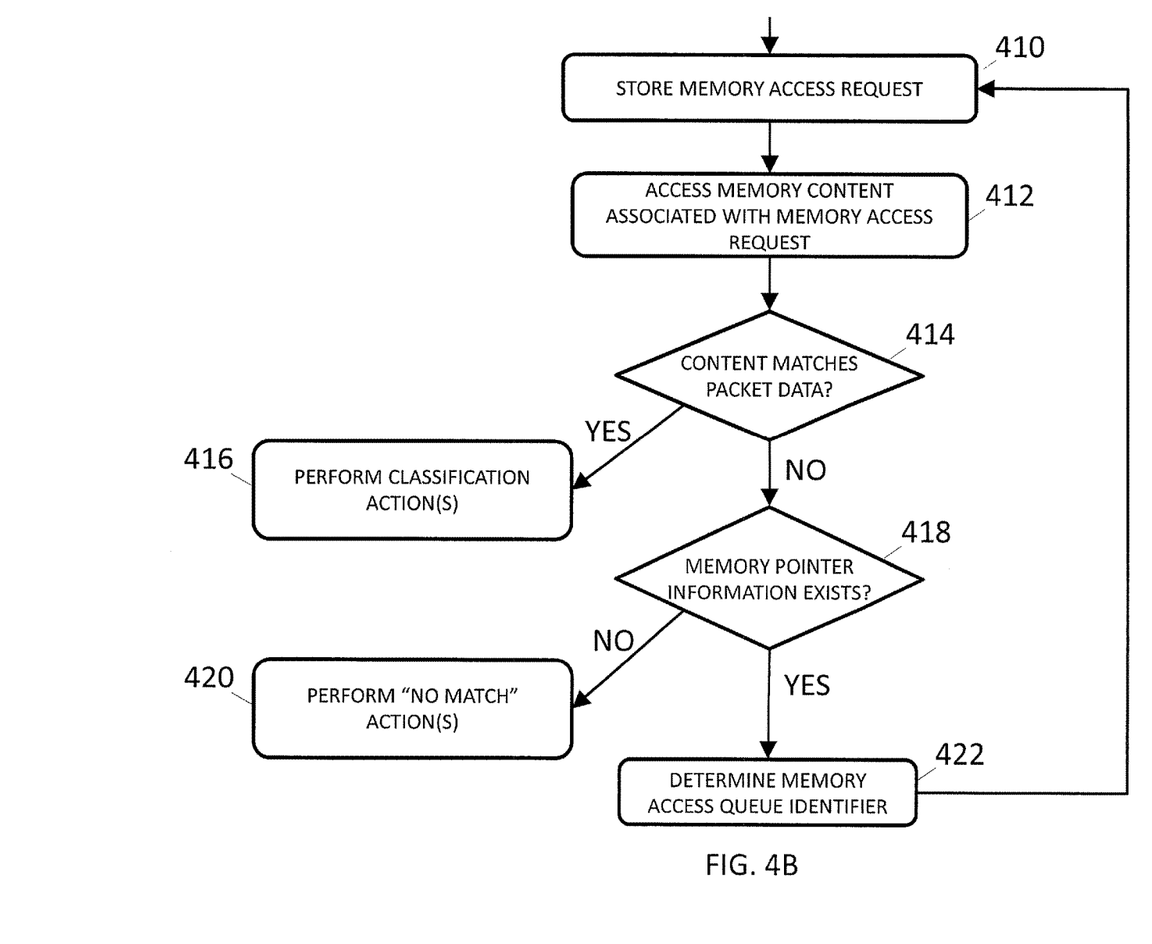

FIGS. 4A and 4B are diagrams illustrating an exemplary memory access process associated with packet classification according to an embodiment of the subject matter described herein. In some embodiments, exemplary process 400, or portions thereof, may be performed by or at computing platform 100, PCM 102, and/or another node or module. In some embodiments, process 400 may include steps 402-422.

Referring to FIG. 4A, at step 402, a packet may be received. For example, PCM 102 may receive a packet containing packet header information.

At step 404, packet header information may be extracted from the received packet. For example, PCM 102 may extract packet header information including a source address, a source port, a destination address, a destination port, a protocol identifier, a flow identifier, and/or a sequence number At step 406, one or more hash functions may be computed using the extracted packet header information. For example, PCM 102 or a related entity may generate hash values (e.g., values within a given range (e.g., 0-1499)) using a hash function, a modulus operation, and packet header information. In another example, PCM 102 or a related entity may generate hash values using two of more hash functions and/or other operations.

At step 408, a memory address identifier and/or a memory access queue may be determined using hash values. For example, a hash value '1200' may be represented as '10010110000' in binary. In this example, the hash value or a portion therein (e.g., the three left most bits of the hash value or '100') may be used to determine or identify a memory address identifier, such as a memory bank of '1' and a row address of '00'. In another example, a hash value or a portion therein, (e.g., the two right most bits of the hash value) may be used to determine or identify a memory access queue for queuing a memory access request associated with a corresponding packet.

In some embodiments, a memory access queue may be determined using information associated with a memory address identifier. For example, assuming that each memory bank is associated with a particular memory access queue and that a memory address identifier indicates a memory bank of '1', PCM 102 or a related entity (e.g., controller 202) may determine that a first memory access queue from among memory access queues 206 should be used for the related memory related command.

At step 410, a memory access request and/or other memory related commands may be stored. For example, PCM 102 or a related entity (e.g., controller 202) may insert a memory read request or corresponding memory related commands into one of memory access queues 206. In this example, the utilized memory access queue may be determined using a memory address identifier, memory bank availability, and/or a hash value.

In some embodiments, PCM 102 and/or a related entity may select memory related command(s) from memory access queue(s) 206. In such embodiments, the selected commands may be sent and processed by PCM storage 108 or memory banks 208-222 therein.

At step 412, memory content associated with the memory access request may be accessed. For example, after sending a memory read request or other memory related command to PCM storage 108, PCM 102 may receive information stored in PCM storage 108. In this example, the information may include flow identifying information (e.g., a source address, a destination address, and/or a FLID), memory pointer information, and/or metrics (e.g., a packet counter value) associated with the flow.

At step 414 it may be determined whether accessed memory content matches data from the received packet. For example, memory content from PCM storage 108 may include flow identifying information. In this example, PCM 102 or a related entity may compare the flow identifying information and packet header information associated with a packet received at step 402. If the accessed memory content matches the data from the received packet (e.g., if accessed memory content is associated with the same flow as the received packet), step 416 may occur. If not, step 418 may occur.

At step 416, one or more packet classification actions may be performed. For example, using flow related metrics obtained from PCM storage 108, a packet count metric may be incremented and/or another metric may be generated. In this example, PCM 102 or a related entity may be configured to store the updated metric(s) at PCM storage 108 for future use.

At step 418, it may be determined whether memory pointer information exists in the accessed memory content. For example, memory content from PCM storage 108 may include memory pointer information indicating a memory address identifier. In this example, PCM 102 or a related entity may generate a memory access request for requesting memory content associated with the memory pointer information. In another example, memory content from PCM storage 108 may not include memory pointer information. If the accessed memory content contains memory pointer information, step 420 may occur. If not, step 422 may occur.

At step 420, one or more "no match" actions may be performed. Exemplary "no match" actions may include identifying a related flow, incrementing a packet counter value, generating a packet related metric, logging packet related information, generating a notification message, and/or generating an error message.

In some embodiments, when memory pointer information does not exist for a given memory content, memory pointer information may be generated. For example, assuming a packet is associated with a FLID of '86' and no memory content (e.g., data entry) is associated with this packet or flow, PCM 102 or a related entity may perform a memory allocation operation for allocating memory at PCM storage 108. In this example, PCM 102 may use the allocated memory for storing flow identifying data and/or related metrics about the packet or flow. Continuing with the above example, PCM 102 may also modify memory content associated with a particular memory address (e.g., a memory address in a linked list data structure) to include memory pointer information indicating a memory address identifier for the allocated memory, thereby linking the allocated memory to an existing memory address in a linked list data structure.

At step 422, a memory access queue may be determined for a new memory access request associated with the memory pointer information. For example, PCM 102 or a related entity may generate a memory access request for requesting memory content associated with a memory address identifier indicated by memory pointer information. In this example, a memory access queue may be selected for the memory access request using one or more factors. Exemplary factors may include hash function(s), memory bank availability, and/or memory address identifier(s). After generating a memory access request and determining an appropriate memory access queue for receiving the memory access request, step 410 may occur.

It will be appreciated that FIGS. 4A and 4B are for illustrative purposes and that different and/or additional steps other than those depicted in FIGS. 4A and 4B may occur.

Figure 5:
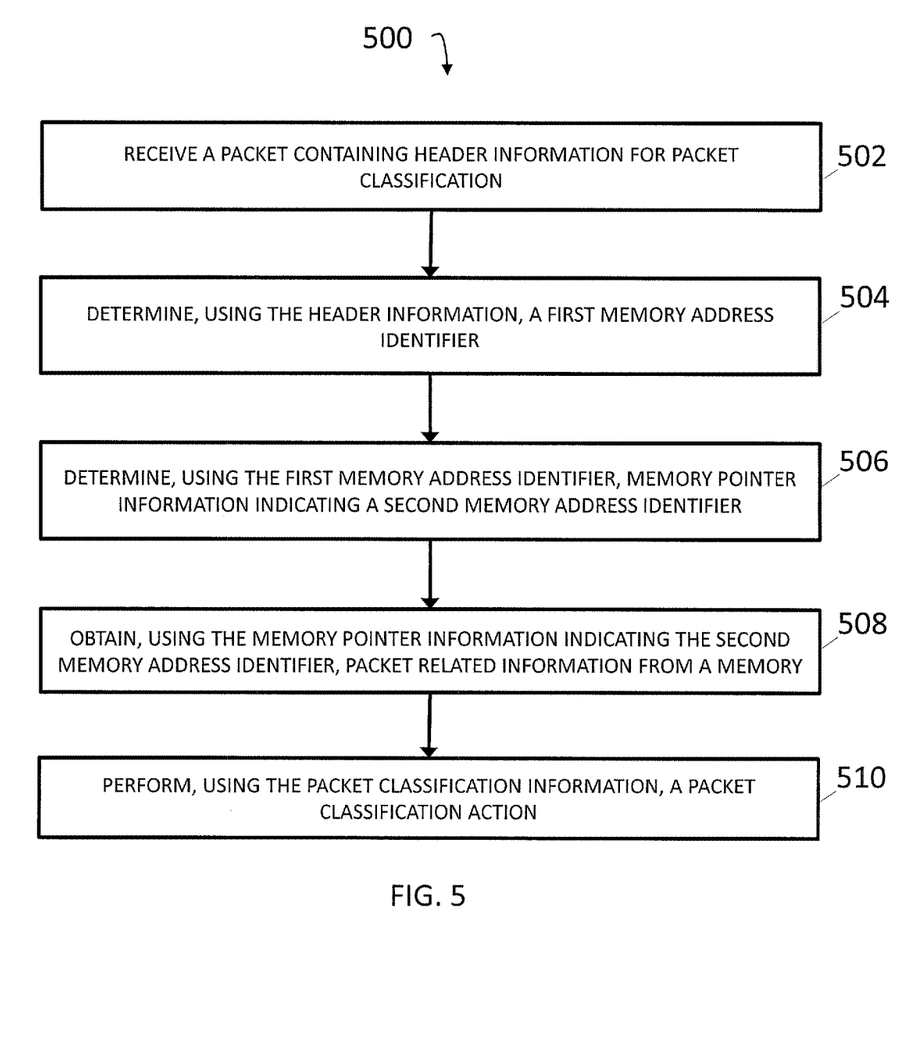
FIG. 5 is a diagram illustrating an exemplary process for packet classification according to an embodiment of the subject matter described herein.

FIG. 5 is a diagram illustrating an exemplary process for packet classification according to an embodiment of the subject matter described herein. In some embodiments, exemplary process 500, or portions thereof, may be performed by or at computing platform 100, PCM 102, and/or another node or module. For example, computing platform 100 and/or PCM 102 may include a network equipment test device and/or a testing platform for testing one or more performance aspects associated with traffic source(s) 106. In another example, PCM 102 may be configured to classify live or real (e.g., non-test) packets, e.g., in a live (e.g., non-test) network.

At step 502, a packet containing header information for packet classification may be received. For example, PCM 102 or communications interface(s) 200 may receive a packet containing a source address, a destination address, and other header related information.

In some embodiments, header information may include a source address, a source port, a destination address, a destination port, a protocol identifier, a flow identifier, and/or a sequence number.

At step 504, a first memory address identifier may be determined using the header information. For example, PCM 102 or a related entity may determine a memory address identifier using one or more hash functions and the header information.

In some embodiments, determining a first memory address identifier may include determining, using one or more hash functions and header information, a first memory access queue identifier associated with the first memory address identifier.

At step 506, memory pointer information indicating a second memory address identifier may be determined using the first memory address identifier.

In some embodiments, determining, using a first memory address identifier, memory pointer information indicating a second memory address identifier may include determining, using the header information and a first memory content associated with a first memory address identifier, that the first memory content is not associated with the packet, in response to determining that the first memory content is not associated with the packet, determining whether the first memory content includes memory pointer information indicating a second memory address identifier, in response to determining that the memory content includes the memory pointer information, determining, using the memory pointer information or other information, a second memory access queue identifier, storing, in a second memory access queue associated with the second memory access queue identifier, a second memory read request requesting a second memory content associated with the second memory address identifier, and in response to the second memory read request, reading the second memory content associated with the second memory address identifier.

At step 508, packet related information may be obtained from a memory using memory pointer information indicating a second memory address identifier, where the memory pointer information may be associated with the first memory address identifier. For example, memory pointer information indicating a second memory address may be stored at or near a first memory address indicated by a first memory address identifier.

In some embodiments, memory may include a RAM, a DRAM, an SDRAM, and/or a non-CAM.

In some embodiments, a plurality of memory access queues may be utilized to access memory and wherein each of the plurality of memory access queues are associated with one or more portions of the memory.

In some embodiments, obtaining packet related information from memory may include storing, in a first memory access queue associated with a first memory access queue identifier, a first memory read request requesting a first memory content associated with the first memory address identifier, and in response to processing the first memory read request, reading the first memory content associated with the first memory address identifier.

In some embodiments, obtaining packet related information from memory may include determining, using the header information and a first memory content associated with a first memory address identifier, that the first memory content is associated with the packet.

At step 510, a packet classification action may be performed using the packet related information. For example, after obtaining information about a flow from PCM storage 108, PCM 102 may update one or more statistics associated with the flow and may store the updated statistics at or near a relevant memory address.

In some embodiments, a packet classification action may include incrementing a packet counter value, generating a packet related metric, logging packet related information, generating a notification message, and/or generating an error message.

While the above description includes memory access with regard to perform packet classification, it will be appreciated that aspects of the present subject matter may be usable for memory access in various situations. For example, some aspects of the present subject matter may be advantageous for accessing memory that includes a RAM, a DRAM, an SDRAM, and/or a non-CAM.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for packet classification, the method comprising:
   receiving a packet containing header information for packet classification;
   determining, using the header information and a first hash function, a first memory address identifier indicating a first memory address of a memory;
   determining, using one or more hash functions and the header information, a first memory access queue associated with the first memory address identifier, wherein the one or more hash functions includes the first hash function or a second hash function, wherein a plurality of memory access queues are utilized to access the memory and wherein each of the plurality of memory access queues is associated with one or more different portions of the memory;
   determining, using the first memory address identifier and the first memory access queue associated with the first memory address identifier, memory pointer information indicating a second memory address identifier indicating a second memory address of the memory, wherein the memory pointer information is stored at the first memory address;
   obtaining, using the memory pointer information indicating the second memory address identifier and a second memory access queue associated with the second memory address identifier, packet related information stored at the second memory address; and
   performing, using the packet related information, a packet classification action.

2. The method of claim 1 wherein determining, using the first memory address identifier and the first memory access queue associated with the first memory address identifier, the memory pointer information indicating the second memory address identifier includes:
  inserting, in the first memory access queue, a first memory read request requesting a first memory content associated with the first memory address identifier;
  processing the first memory read request; and
  in response to processing the first memory read request, reading the first memory content associated with the first memory address identifier.

3. The method of claim 1 wherein determining, using the first memory address identifier and the first memory access queue associated with the first memory address identifier, the memory pointer information indicating the second memory address identifier includes:
  determining, using the header information and a first memory content associated with the first memory address identifier, that the first memory content is not associated with the packet;
  in response to determining that the first memory content is not associated with the packet, determining that the first memory content includes the memory pointer information indicating the second memory address identifier;
  in response to determining that the first memory content includes the memory pointer information, determining, using the memory pointer information or other information, the second memory access queue associated with the second memory address identifier;
  inserting, in the second memory access queue, a second memory read request requesting a second memory content associated with the second memory address identifier;
  processing the second memory read request; and
  in response to processing the second memory read request, reading the second memory content associated with the second memory address identifier.

4. The method of claim 1 wherein the header information includes a source address, a source port, a destination address, a destination port, a protocol identifier, a flow identifier, or a sequence number.

5. The method of claim 1 wherein the memory includes a random-access memory (RAM), a dynamic RAM (DRAM), a synchronous DRAM (SDRAM), or a non-content-addressable memory (non-CAM).

6. The method of claim 1 wherein the packet classification action includes incrementing a packet counter value, generating a packet related metric, logging the packet related information, generating a notification message, or generating an error message.

7. A system for packet classification, the system comprising:
  a packet classifier comprising:
    at least one processor; and
    a memory, wherein the packet classifier is configured to receive a packet containing header information for packet classification, to determine, using the header information and a first hash function, a first memory address identifier indicating a first memory address of a memory, to determine, using one or more hash functions and the header information, a first memory access queue associated with the first memory address identifier, wherein the one or more hash functions includes the first hash function or a second hash function, to determine, using the first memory address identifier and the first memory access queue associated with the first memory address identifier, memory pointer information indicating a second memory address identifier indicating a second memory address of the memory, wherein the memory pointer information is stored at the first memory address, to obtain, using the memory pointer information indicating the second memory address identifier and a second memory access queue associated with the second memory address identifier, packet related information stored at the second memory address, and to perform, using the packet related information, a packet classification action, wherein the packet classifier is configured to determine, using one or more hash functions and the header information, a first memory access queue identifier associated with the first memory address identifier, wherein the packet classifier is configured to utilize a plurality of memory access queues associated with accessing the memory and wherein each of the plurality of memory access queues is associated with one or more different portions of the memory.

8. The system of claim 7 wherein the packet classifier is configured to insert, in the first memory access queue, a first memory read request requesting a first memory content associated with the first memory address identifier, to process the first memory read request, and in response to processing the first memory read request, to read the first memory content associated with the first memory address identifier.

9. The system of claim 7 wherein the packet classifier is configured to determine, using the header information and a first memory content associated with the first memory address identifier, that the first memory content is not associated with the packet, in response to determining that the first memory content is not associated with the packet, to determine that the first memory content includes the memory pointer information indicating the second memory address identifier, in response to determining that the first memory content includes the memory pointer information, to determine, using the memory pointer information or other information, the second memory access queue associated with the second memory address identifier, to insert, in the second memory access queue, a second memory read request requesting a second memory content associated with the second memory address identifier, to process the second memory read request, and in response to processing the second memory read request, to read the second memory content associated with the second memory address identifier.

10. The system of claim 7 wherein the header information includes a source address, a source port, a destination address, a destination port, a protocol identifier, a flow identifier, or a sequence number.

11. The system of claim 7 wherein the memory includes a random-access memory (RAM), a dynamic RAM (DRAM), a synchronous DRAM (SDRAM), or a non-content-addressable memory (non-CAM).

12. The system of claim 7 wherein the packet classification action includes incrementing a packet counter value, generating a packet related metric, logging the packet related information, generating a notification message, or generating an error message.

13. A non-transitory computer readable medium comprising computer executable instructions embodied in the non-transitory computer readable medium that when executed by a processor of a computer perform steps comprising:
  receiving a packet containing header information for packet classification;

determining, using the header information and a first hash function, a first memory address identifier indicating a first memory address of a memory;

determining, using one or more hash functions and the header information, a first memory access queue associated with the first memory address identifier, wherein the one or more hash functions includes the first hash function or a second hash function, wherein a plurality of memory access queues are utilized to access the memory and wherein each of the plurality of memory access queues is associated with one or more different portions of the memory;

determining, using the first memory address identifier and the first memory access queue associated with the first memory address identifier, memory pointer information indicating a second memory address identifier indicating a second memory address of the memory, wherein the memory pointer information is stored at the first memory address;

obtaining, using the memory pointer information indicating the second memory address identifier and a second memory access queue associated with the second memory address identifier, packet related information stored at the second memory address; and performing, using the packet related information, a packet classification action.

14. The non-transitory computer readable medium of claim 13 wherein determining, using the first memory address identifier and the first memory access queue associated with the first memory address identifier, the memory pointer information indicating the second memory address identifier includes:

inserting, in the first memory access queue, a first memory read request requesting a first memory content associated with the first memory address identifier;

processing the first memory read request; and in response to processing the first memory read request, reading the first memory content associated with the first memory address identifier.

* * * * *

UNITED STATES PATENT AND TRADEMARK OFFICE
CERTIFICATE OF CORRECTION

PATENT NO. : 10,230,824 B2  
APPLICATION NO. : 14/944078  
DATED : March 12, 2019  
INVENTOR(S) : Matthew R. Bergeron Page 1 of 1

It is certified that error appears in the above-identified patent and that said Letters Patent is hereby corrected as shown below:

On the Title Page

In item (71), in Column 1, in "Applicant", Line 1, delete "Ixia, Calabasas, CA (US)" and insert -- Keysight Technologies Singapore (Holdings) Pte. Ltd, Minneapolis, MN (US) --, therefor.

In item (73), in Column 1, in "Assignee", Line 3, delete "LTE.," and insert -- LTD., --, therefor.

Signed and Sealed this  
Fifth Day of May, 2020

Andrei Iancu  
*Director of the United States Patent and Trademark Office*